United States Patent
Nakane

(10) Patent No.: US 6,591,147 B2
(45) Date of Patent: Jul. 8, 2003

(54) ADJUSTMENT CONTROL AND ADJUSTMENT CONTROL METHOD

(75) Inventor: Rintaro Nakane, Yokohama (JP)

(73) Assignees: Kabushiki Kaisha Toshiba, Kawasaki (JP); Toshiba Tec Kabushiki Kaisha, Tokyo (JP)

(*) Notice: Subject to any disclaimer, the term of this patent is extended or adjusted under 35 U.S.C. 154(b) by 224 days.

(21) Appl. No.: 09/799,526

(22) Filed: Mar. 7, 2001

(65) Prior Publication Data

US 2001/0044662 A1 Nov. 22, 2001

Related U.S. Application Data

(63) Continuation of application No. PCT/JP99/04842, filed on Sep. 7, 1999.

(30) Foreign Application Priority Data

Sep. 7, 1998 (JP) .............................. 10-252678

(51) Int. Cl.[7] .............................. G05B 13/02
(52) U.S. Cl. .............................. 700/29; 700/28; 700/59; 700/33; 700/45; 399/42; 399/363; 399/406
(58) Field of Search .............................. 700/29, 28, 59, 700/33, 45; 399/42, 363, 406

(56) References Cited

U.S. PATENT DOCUMENTS

| | | | |
|---|---|---|---|
| 3,634,664 A | 1/1972 | Valek | 235/151.11 |
| 4,763,627 A | 8/1988 | Tomisawa | 123/440 |
| 5,079,691 A | 1/1992 | Heck et al. | 364/165 |
| 5,457,625 A * | 10/1995 | Lim et al. | 700/29 |
| 5,493,502 A * | 2/1996 | Niwa | 700/188 |
| 5,610,843 A * | 3/1997 | Chou | 702/109 |
| 5,661,669 A * | 8/1997 | Mozumder et al. | 702/84 |
| 5,682,309 A | 10/1997 | Bartusiak et al. | 364/149 |
| 6,393,387 B1 * | 5/2002 | Adriaans et al. | 703/27 |

FOREIGN PATENT DOCUMENTS

| | | |
|---|---|---|
| JP | 62-72004 | 4/1987 |
| JP | 6-110286 | 4/1994 |
| JP | 7-281708 | 10/1995 |
| JP | 9-218470 | 8/1997 |
| JP | 11-38737 | 2/1999 |

OTHER PUBLICATIONS

U.S. patent application Ser. No. 09/012,584, Kiji, filed Jan. 23, 1998.

* cited by examiner

*Primary Examiner*—John Follansbee
*Assistant Examiner*—Thomas Pham
(74) *Attorney, Agent, or Firm*—Foley & Lardner

(57) ABSTRACT

In the present invention, control amounts are input from plural sensors. Good/bad determination is performed to determine whether all deviations of control amount variables are within tolerable ranges. If a determination result is "bad", it is determined whether a position in a control amount deviation space is present in success experiences learnt at this time point. If there is the experience, a learning control using the operation amount of the success experience is executed. Otherwise, the operation amount is determined based on an adaptive control.

4 Claims, 15 Drawing Sheets

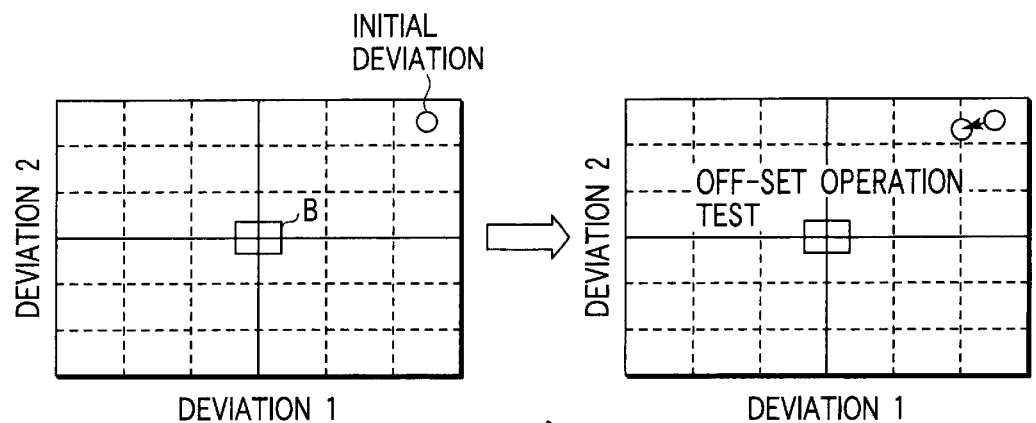
F I G. 2A    F I G. 2B
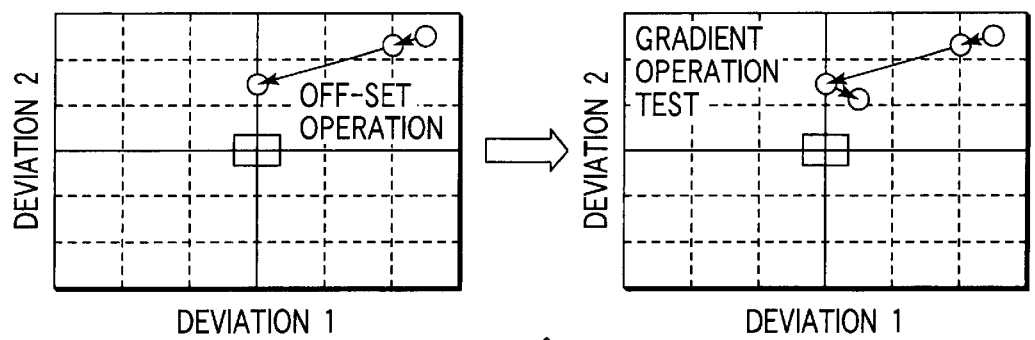
F I G. 2C    F I G. 2D
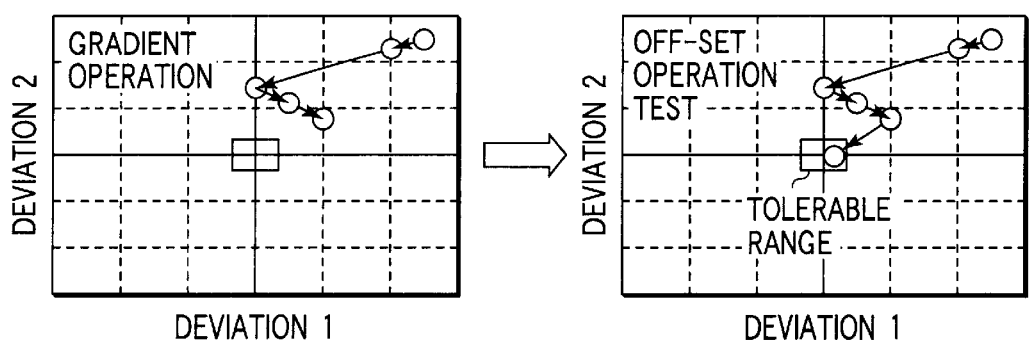
F I G. 2E    F I G. 2F

ADJUSTMENT CONTROL AND ADJUSTMENT CONTROL METHOD

CROSS-REFERENCE TO RELATED APPLICATIONS

This is a Continuation Application of PCT Application No. PCT/JP99/04842, filed Sep. 7, 1999, which was not published under PCT Article 21(2) in English.

This application is based upon and claims the benefit of priority from the prior Japanese Patent Application No. 10-252678, filed Sep. 7, 1998, the entire contents of which are incorporated herein by reference.

BACKGROUND OF THE INVENTION

The present invention relates to an adjustment control system such as an image quality maintaining adjustment means for an optical unit for reading an original image, a color laser printer, a color digital copying machine, etc., which is provided in an image forming apparatus such as an analog copying machine, a digital copying machine or a facsimile, as well as to an adjustment control method.

As an example of an image forming apparatus, an analog copying machine comprises an optical unit for reading an image of an original placed on an original table of glass, and a process unit for forming a developer image on the basis of the image read by the optical unit and transferring it onto a recording medium such as a paper sheet.

In the copying machine, a resolving power of a finally obtained copy image varies depending on a resolving power for exposure on a photosensitive drum and a fidelity reproducibility of an electrophotographic process for the exposure image.

The resolving power for exposure on the photosensitive drum varies depending on lens characteristics, a stop, mirror flatness, a position and an attitude of a lens and a mirror, relative positions of the original table and the photosensitive drum, etc. As regards the lens characteristics and stop, it is desired that a uniform, high resolving power (MTF characteristics) be obtained over the entire image region of an image surface, the exposure light amount be sufficient, and the total path length be as short as possible. In addition, it is required that the lens characteristics and stop provide a wide tolerable range of resolving power, i.e. focal depth, so as to cancel an error in a relative position among an object surface (original surface), a lens and an image-formation surface (photosensitive drum).

The above requirements are contradictory in physical aspects. In fact, the lens has aberration (e.g. curvature of field). Furthermore, if a demand for decrease in manufacturing cost is considered, it is difficult to meet all the requirements, and optimization needs to be achieved for a compromise.

Normally, a lens optimized as mentioned above is so designed that an ideal (design-value) image-formation surface may be included within a focal depth. However, the relative position among the position/attitude of the lens and mirror, the original table and the photosensitive drum will vary due to a sum of variances in tolerance of many parts and in tolerance of assembly.

Since the lens aberration gradually increases away from the optical axis at the center of the lens, the resolving power gradually decreases toward an end portion of the image-formation surface. In addition, since the photosensitive drum surface serving as the image-formation surface is cylindrical, the variation in the exposure position leads to a variation in optical path length. Degradation in resolving power occurs due to a deviation from the focal position. In addition, the magnification varies and the resolving power deteriorates because of displacement of the same image point due to scanning (since slit exposure is performed, a latent image will blur unless the position on the photosensitive drum is uniform in association with the image points of the original in the slit width in scanning). Thus, if the optical positional relationship between the object surface and the image-formation surface is not kept, the resolving power deteriorates more greatly at end portions of the image-formation surface.

Even if the original surface and the drum exposure position are set in a physically ideal positional relationship, the optical relationship between the object surface and the image surface or the relationship between the focal plane and the image-formation surface will differ from an ideal positional relationship due to the position and attitude of the mirror and lens. If optical parallelism between the focal plane and the image-formation surface is lost, there is only one contact point therebetween. Consequently, degradation in resolving power on the entire image region cannot be improved by the adjustment of the optical path length in the optical-axis direction.

The resolving power may degrade due to such factors as the lens characteristics, e.g. focal depth or MTF characteristics, and positioning of the original table, mirror, lens and photosensitive drum. If the degradation due to these factors are to be improved by enhancing precision in machining the respective parts and precision of parts of the support member, the cost will increase.

It is difficult to observe the degraded resolving power by the naked eye and to specify the factor of degradation, on the basis of the obtained copy image. In addition, to modify/correct the factor will considerably lower the productivity. The degradation in resolving power will occur not only due to optical factors but also due to factors in the image forming process. Moreover, distortion of images will occur due to optical factors, and similar phenomena will occur due to factors in a paper sheet conveying system, etc. Since the degree of distortion is on the order of 100 microns, it is very difficult to quantatively observe it by the naked eye.

Since the above-mentioned adjustment of the optical system is conducted in the production line of copying machines or in the maintenance work, if some element is adjusted, other elements may vary consequently. In most cases, it is difficult to satisfactorily adjust all elements.

Besides, in the case of another example of the image forming apparatus, many users may have felt that the density of copies varies despite the same original being copied by the same copying machine. The variation in image density in electrophotography occurs due to a change or degradation in image formation conditions resulting from a variation in environment or a variation over time. In multi-gradient printers or digital copying machines, as well as analog copying machines, it is important to suppress a variation in image density and to stabilize and maintain the image quality. In particular, in color modes, such a variation will affect not only the density reproducibility but also color reproducibility. Thus, the stabilization in image density is an imperative requirement.

Under the circumstances, a feedback control is performed in the prior art. Plural test patterns are formed on an image carrying body, and the image densities of these test patterns are detected and a variation in gradient characteristics is found. Thus, adjustment and good/bad judgment of the operating portions of the image forming section are repeated in this feedback control. In this case, the calculation of an operation amount corresponding to a control amount deviation is carried out on the basis of a look-up table prepared in advance. The content of such a look-up table is prepared in an off-line mode. In preparation, it is necessary to conduct various experiments and find the characteristics of the object to be adjusted (the operation amount corresponding to the control amount). Thus, a great deal of labor and time is required in the preparation work.

In a multi-input/multi-output system, in general cases, the input/output relationship is not independent. Thus, in order to describe the input/output relationship on the look-up table, the same number of look-up tables as the number of orders of inputs/outputs are required. In the case of the system with a large number of orders, a large memory capacity is required and the identification work is very large. In addition, the relationship does not always coincide with the object apparatus, because of non-linear characteristics, an inter-object variance, reproducibility and a variation over time, etc. The adopted feedback control is feasible for cases where the identification is somewhat incomplete, but the number of times of convergence and control time for good/bad determination become greater by a degree corresponding to a difference from the identified apparatus.

As has been described above, where there are plural adjustment points, such adjustment points may depend on each other in most cases. As regards the dependency, if one adjustment point is adjusted in consideration of one adjustment amount, other plural adjustment amounts may vary. If other adjustment points are operated to correct them, other characteristic amounts may vary. As a result of such phenomena, optimal adjustment becomes difficult, and the adjustment efficient may considerably deteriorate.

BRIEF SUMMARY OF THE INVENTION

The object of the present invention is to provide an adjustment control system and an adjustment control method capable of performing optimal adjustment and a control with high adjustment efficiency.

The present invention provides an adjustment control system comprising: first storage means for storing cases of a plurality of control amounts which have been adjusted and controlled to fall within a predetermined tolerable range; detection means for detecting a plurality of control amounts; determination means for determining whether each of the control amounts detected by the detection means falls within a predetermined tolerable range; judgment means for judging, when it has been determined by the determination means that at least one of the plural control amounts is out of the predetermined tolerable range, whether there is a case among the plural control amounts stored in the first storage means which has been adjusted and controlled to fall within the predetermined tolerable range; first control means for controlling, where the presence of the case of the adjustment control is judged by the judgment means, adjustment to bring each of the detected control amounts within the predetermined tolerable range on the basis of the case; first operation means for determining and operating test operation amounts for measuring sensitivity, based on each detected control amount, where the absence of the case of the adjustment control has been judged by the judgment means; second operation means for determining operation amounts from each detected control amount, based on the sensitivity measured by the test operations performed by the first operation means, and performing repeated operations until each detected control amount may fall with the predetermined tolerable range; second storage means for storing the operation amounts operated by the first operation means and the plural control amounts, as well as the operation amounts repeatedly operated by the second operation means and the plural control amounts; and second control means for storing, when each control amount has fallen within the predetermined tolerable range by the operation of the second operation means, the operation amounts and the plural control amounts stored in the second storage means into the first storage means as cases of adjustment control.

The present invention provides an adjustment control system comprising: adjustment means for performing adjustment by moving a plurality of objects requiring plural position controls such that the objects may be positioned at target positions; first storage means for storing a case of adjustment performed by the adjustment means by moving the objects to the target positions; detection means for detecting positions of the plural objects; determination means for determining whether a deviation between the position of the object detected by the detection means and the target position of the object is within a predetermined tolerable range; judgment means for judging, when the determination means has determined that the deviation of at least one of the plural objects is not within the predetermined tolerable range, whether there is a case in which the position of the object at this time has been adjusted and controlled to fall within the predetermined tolerable range of the target position of the object; first adjustment control means for controlling, when the judgment means has judged that the case of adjustment is present, the adjustment means on the basis of the case, thereby moving the position of the object detected by the detection means into the predetermined range of the target position; measuring means for measuring sensitivity of the adjustment means when the judgment means has judged that the case of adjustment is not present; second adjustment control means for controlling the adjustment means on the basis of the sensitivity measured by the measuring means and repeating the adjustment operation of the adjustment means until the determination means determines that the deviation between the position of the object detected by the detection means and the target position of the object is within the predetermined range; second storage means for storing a history of the adjustment operation of the second adjustment control means; and means for additionally storing the history of the adjustment operation stored in the second storage means into the first storage means when the second adjustment control means causes the adjustment means to move the object and the deviation between the position of the object and the target position of the object has fallen within the predetermined tolerable range.

The present invention provides an adjustment control method comprising: storing in first storage means cases of a plurality of control amounts which have been adjusted and controlled to fall within a predetermined tolerable range; detecting a plurality of control amounts; determining whether each of the detected control amounts falls within a predetermined tolerable range; judging, when it has been determined by the determination that at least one of the plural control amounts is out of the predetermined tolerable range, whether there is a case among the plural control amounts stored in the first storage means which has been adjusted and controlled to fall within the predetermined tolerable range; controlling, where the presence of the case of the adjustment control is judged by the judgment, adjustment to bring each of the detected control amounts within the predetermined tolerable range on the basis of the case;

determining and operating test operation amounts for measuring sensitivity, based on each detected control amount, where the absence of the case of the adjustment control has been judged by the judgment; determining operation amounts from each detected control amount, based on the sensitivity measured by the test operations, and performing repeated operations until each detected control amount may fall with the predetermined tolerable range; storing in second storage means the operated operation amounts and the plural control amounts, as well as the repeatedly operated operation amounts and the plural control amounts; and storing, when each control amount has fallen within the predetermined tolerable range by the operation, the operation amounts and the plural control amounts stored in the second storage means into the first storage means as cases of adjustment control.

The present invention provides an adjustment control method system comprising: performing adjustment with adjustment means by moving a plurality of objects requiring plural position controls such that the objects may be positioned at target positions; storing in first storage means a case of adjustment performed by the adjustment means by moving the objects to the target positions; detecting positions of the plural objects; determining whether a deviation between the detected position of the object and the target position of the object is within a predetermined tolerable range; judging, when it has been determined that the deviation of at least one of the plural objects is not within the predetermined tolerable range, whether there is a case in which the position of the object at this time has been adjusted and controlled to fall within the predetermined tolerable range of the target position of the object; controlling, when it has been judged that the case of adjustment is present, the adjustment means on the basis of the case, thereby moving the detected position of the object into the predetermined range of the target position; measuring sensitivity of the adjustment means when it has been judged that the case of adjustment is not present; controlling the adjustment means on the basis of the measured sensitivity and repeating the adjustment operation of the adjustment means until it is determined that the deviation between the detected position of the object and the target position of the object is within the predetermined range; storing in second storage means a history of the adjustment operation; and additionally storing the history of the adjustment operation stored in the second storage means into the first storage means when the adjustment means moves the object and the deviation between the position of the object and the target position of the object has fallen within the predetermined tolerable range.

The present invention provides an adjustment control system comprising: first storage means for storing cases of a plurality of control amount deviations which have been adjusted and controlled to fall within a predetermined tolerable range; detection means for detecting a plurality of control amounts; deviation calculation means for calculating each control amount deviation on the basis of the plural control amounts detected by the detection means and predetermined target values; first determination means for determining whether each control amount deviation calculated by the deviation calculation means falls within a predetermined tolerable range, and outputting a status "good" if all the control amount deviations are within the predetermined tolerable range; second determination means for issuing, when it has been determined by the first determination means that at least one of the control amount deviations is out of the predetermined tolerable range, an error status where a current control number-of-times exceeds a present maximum control number-of-times, and issuing a status "bad" where the current control number-of-times is less than the present maximum control number-of-times; and control means for determining, when the status "bad" has been issued from the second determination means, operation amounts based on each calculated control amount deviation, and performing an adjustment control to bring each calculated control amount deviation within the predetermined tolerable range.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2A to FIG. 2F show an example of a converging step in the adaptive control;

DETAILED DESCRIPTION OF THE INVENTION

Embodiments of the present invention will now be described with reference to the accompanying drawings.

Figure 1:
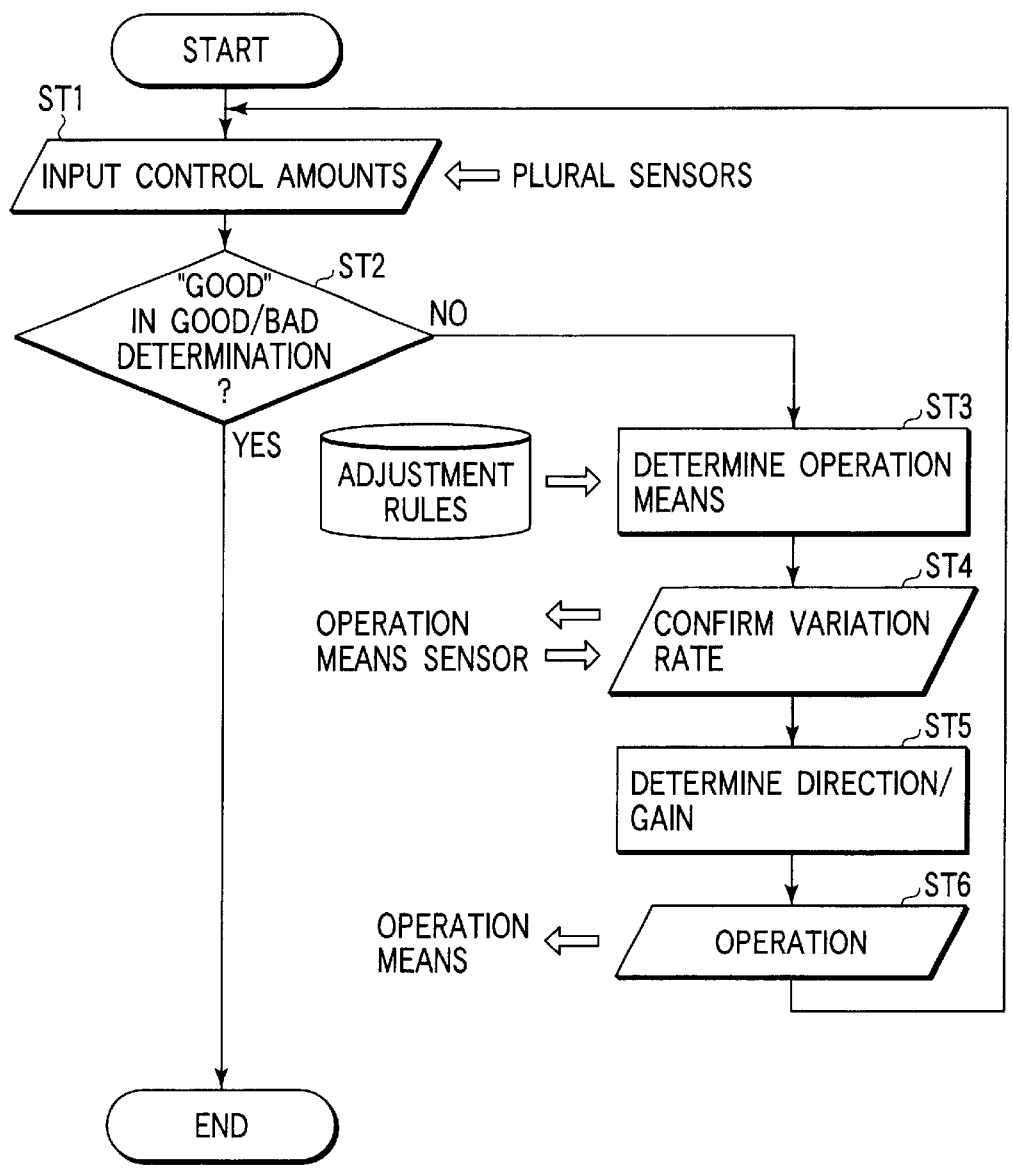
FIG. 1 is a flow chart of an adaptive control with plural adjustment points according to an adjustment control system of the present invention.

FIG. 1 is a flow chart of an adaptive control with plural adjustment points according to an adjustment control system of the present invention. In this adjustment control system, an entire control is executed by a CPU, etc.

In step ST1, control amounts are input from plural sensors (plural adjustment points). If all deviations of control amount variables are within tolerable ranges, the result is determined to be "good" in a good/bad determination step (ST2). Otherwise, the result is determined to be "bad".

If the determination result is "bad" in step ST2, operation means is determined according to prestored adjustment rules for selecting operation means to be operated in association with a control amount pattern (ST3). When the selected operation means is actually performed according to predetermined operations, a proportional control gain is found from a variation (ST4) of a control amount of interest (described in the adjustment rule), i.e. sensitivity, and an operation amount for decreasing a deviation (decreasing a deviation to zero in the case of proportional control) is calculated (ST5). Based on the calculated operation amount, the selected operation means is activated (ST6).

The operations of steps ST3 to ST6 are repeated through step ST1 and the good/bad determination of step ST2, and deviations are converged. If convergence is completed (i.e. all deviations have fallen within tolerable ranges) and the determined result in step ST2 has become "good", the control is finished.

In the adjustment rules, combinations for convergence are chosen from qualitative knowledge of dependency (independent, dependent) of control amounts associated with operation amount variables. Thus, convergence is finally attained by feedback unless the knowledge of the dependency is extremely different from the actuality.

Thereby, an adjustment control system capable of easily achieving convergence can be realized without labor to collect quantitative data relating to values of all operation amount variables associated with all the control amount spaces.

Quantitative knowledge is not provided in this technique. The technique is based on the sensitivity with which the selected operation means is actually operated in the situation. Thus, convergence does not become difficult in connection with the dependency of other operation means, an inter-object variance in characteristics of the object to be controlled, and the variance over time.

FIG. 2A to FIG. 2F show an example of a converging step in the adaptive control described with reference to FIG. 1.

FIG. 2A to FIG. 2F represent two control amount spaces in an example of a two-input/two-output system. The control amount deviations in the respective spaces are indicated by deviation 1 and deviation 2. In FIG. 2A, a central intersection of orthogonal axes indicates an amount deviation 0 (zero). A rectangular region B around the central intersection indicates a tolerable deviation range, i.e. a tolerable range, of the respective deviations.

In this example, the following adjustment rules are generated and selected.

Adjustment rule 1 . . . both deviations are out of the tolerable range→operation means 1 (off-set operation means). Attention is paid to a greater deviation, and the operation is determined based on sensitivity.

Adjustment rule 2 . . . one of deviations is within the tolerable range→operation means 2 (gradient operation means). Attention is paid to a greater deviation, and the operation is determined based on sensitivity.

FIG. 2A shows a case where initial values of both deviation 1 and deviation 2, which have been obtained by initial detection, are out of the tolerable range.

According to the above-described adjustment rule, the operation means 1 (off-set operation means) is selected. Since the sensitivity has not been confirmed, a test operation is performed with a predetermined operation amount, and detection is performed once again. A variation amount from the initial value of deviation 1, which is the deviation of interest, i.e. the sensitivity of deviation 1 as shown in FIG. 2B, is obtained.

From the obtained sensitivity of deviation 1, the operation amount for decreasing the deviation 1 to "0" is calculated. Based on the calculated operation amount, the operation means 1 is operated once again, and the deviation 1 is brought into the tolerable range, as shown in FIG. 2C, while deviation 2 is out of the tolerable range.

Then, according to the above-described adjustment rule, the operation means 2 (gradient operation means) is selected. Since the sensitivity has not been confirmed, a test operation is performed with a predetermined operation amount, and detection is performed once again. A variation amount of deviation 2, which is the deviation of interest, i.e. the sensitivity of deviation 2 as shown in FIG. 2C, is obtained.

From the obtained sensitivity of deviation 2, the operation amount for decreasing the deviation 2 to "0" is calculated. Based on the calculated operation amount, the operation means 2 is operated once again, and both the deviations 1 and 2 have fallen out of the tolerable range (however, the deviations have come close to "0", i.e. have converged), as shown in FIG. 2F.

Subsequently, according to the two adjustment rules, the detection, determination, operation means selection, tests, sensitivity acquisition, operation amount determination and operations are repeated, and both deviations are converged into the tolerable range, as shown in FIG. 2F.

As in the example shown in FIG. 2A to FIG. 2F, the convergence can be carried out even if one operation amount variation depends on two control amount variables (i.e. not independent).

In the adaptive control, only the presence/absence of the dependency of control variation amounts 1 and 2 is given as qualitative knowledge with respect to operation variation amounts 1 and 2. The adjustment rules are then generated according to predetermined algorithms. Based on the adjustment rules, quantitative knowledge is given by means for successively detecting the sensitivity of the actual object and determining the operation amount. Thereby, the labor for development is reduced, and an adjustment control system matching with an inter-object variance or a variation over time can be obtained.

However, when the above-described feedback control system is to be applied, there is a case where the number of times of control (the number of times of feedback loop) and the time of control are limited.

For example, in the case of the control for detecting the density of test development and controlling image-forming conditions for stabilizing the image quality in the image forming apparatus, the developing agent is consumed by the test development and the operation time aggravates long-time degradation of various parts and materials. In addition, the use by users is disabled (prohibited) during control. Thus, a decrease in the number of times of control amount detection and in the control time is desired.

In addition, in the case of application as the adjusting device or function at the time of manufacture or maintenance, the control time should be reduced in consideration of the number of adjustment steps.

In the adaptive control, with the provision of the means for successively detecting the sensitivity and determining the operation amount, the system can reduce the labor for development and can match with an inter-object variance or a variation over time. However, due to lack of quantitative knowledge, the condition for the limitation to the number of times of control may not be satisfied.

In general, a controller is considered to be an inverse model of characteristics of a control object. Accordingly, a controller can be produced if input/output characteristics of the object, that is, the control amount relative to the operation amount, can be quantatively measured. For example, there are known methods wherein operation amounts relative to control amounts, as in a LUT (look-up table), are prestored in storage means and these amounts are referred to in accordance with actual control amounts in order to determine the operation amounts, or a similar table is prepared based on instructor data (case data).

In these methods, however, the amount of acquired data units is expressed by (number of control amount variables)×((number of divisions of control variation amounts) raised to the power of (number of control amount variables)), and a great deal of labor is required as the number of orders increases.

Moreover, where there is an inter-object variance of object characteristics due to non-observable error factors, statistical data is required and a variation over time cannot be followed by a LUT formed in off-line mode. Control results may deviate from desired control amounts, or the convergence may deteriorate in the feedback control.

A method of on-line learning has been proposed. In this case, however, there are differences in control performance depending on initial values (object data or inverse-function data), and thus data collection as in the on-line mode is needed in advance. Furthermore, at the time of spill-out (exceptional states deviating from the adjustment rules), if previous learning results cannot immediately be used to cope with the situation, erroneous adjustment or malfunction may occur.

A description will now be given of an adjustment control system according to the invention, which can cope with these problems.

Figure 3:
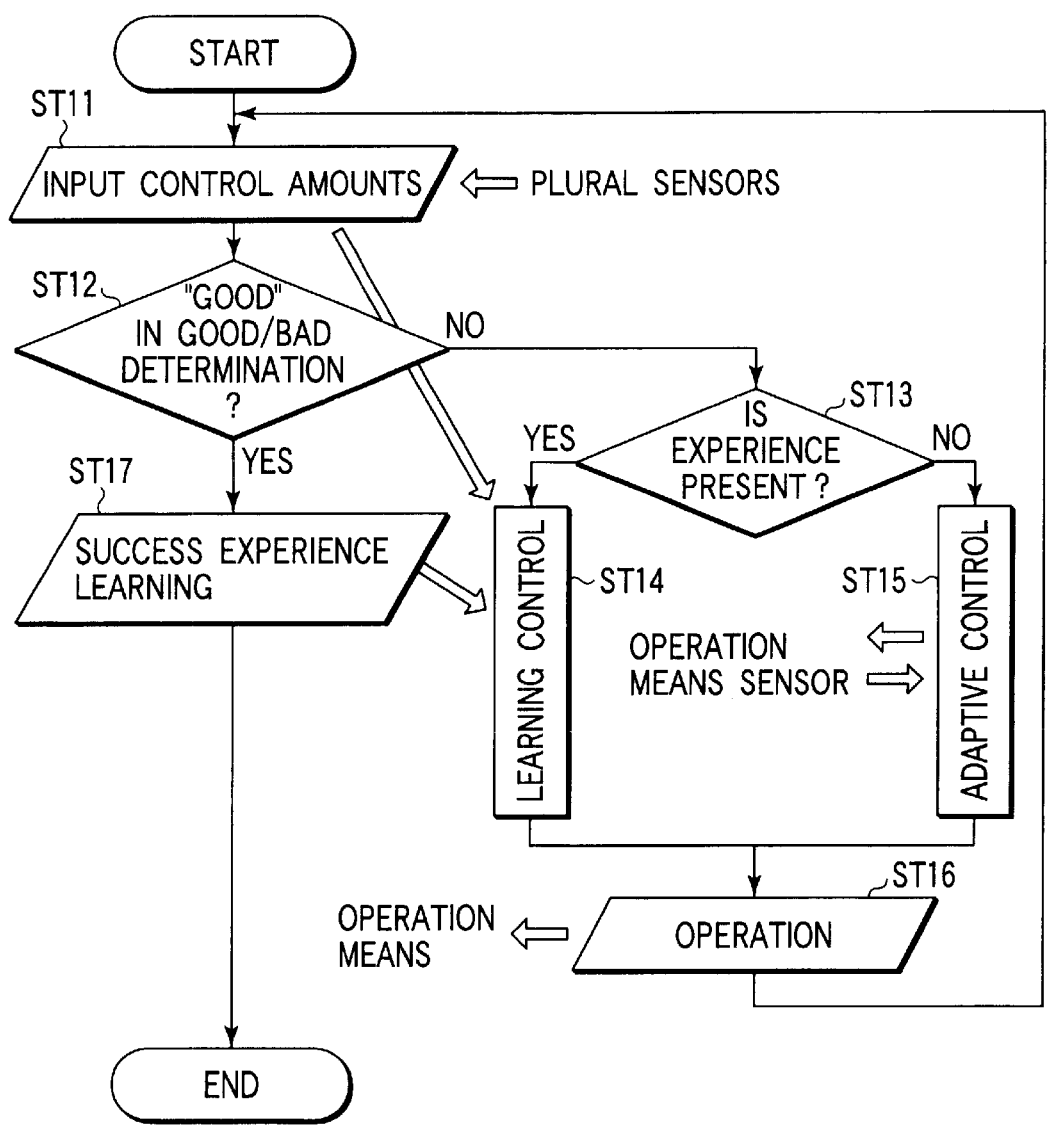
FIG. 3 is a flow chart of a control in which an adaptive control and a learning control are used in the adjustment control system of the invention.

FIG. 3 is a flow chart of a control in which the adaptive control and the learning control according to the adjustment control system of the present invention are combined.

In step ST11, control amounts are input from plural sensors (plural adjustment points). If all deviations of control amount variables are within tolerable ranges, the result is determined to be "good". Otherwise, the result is determined to be "bad" (ST12).

If the result is "bad" in step ST12, it is determined whether a position (to be hereinafter referred to as "control amount pattern") in the control amount deviation space is present in success experiences learnt at this time point (ST13). If there is the experience, the operation amount (variation amount for all operation means) of the success experience is adopted (ST14). Otherwise, the operation amount is determined based on the above-described adaptive control (ST15).

The operation is further executed based on the operation amount of the success experience in step ST14 or the operation amount calculated in step ST15 (ST16).

Accordingly, if there is no experience, select means selected based on the adjustment rule in the adaptive control is operated in a test. Based on the obtained sensitivity, the operation is repeated to achieve convergence (steps ST11, ST12, ST13, ST15, ST16). Although a number of times of control is required, the convergence is completed ("good" in the good/bad determination in step ST12).

At the time the convergence is completed in step ST12, the control amount patterns at the respective time points including the initial deviation at the beginning of control and the test operation, and all the associated operation amount variation amounts relating to the respective control amount patterns up to the completion of convergence are stored (learnt) as success cases (ST17).

The operation amount is thus determined by selection on the basis of the control patterns of the feedback control, in which the converging is ensured like the adaptive control, and of the learning control. Thus, an adjustment control system is provided, wherein the controller design labor is reduced, the convergence is ensured, and the number of times of control is decreased.

FIGS. 4A to 4D show an example of a converging step using the adaptive control described with reference to FIGS. 2A to 2F and the learning control.

Figure 4:
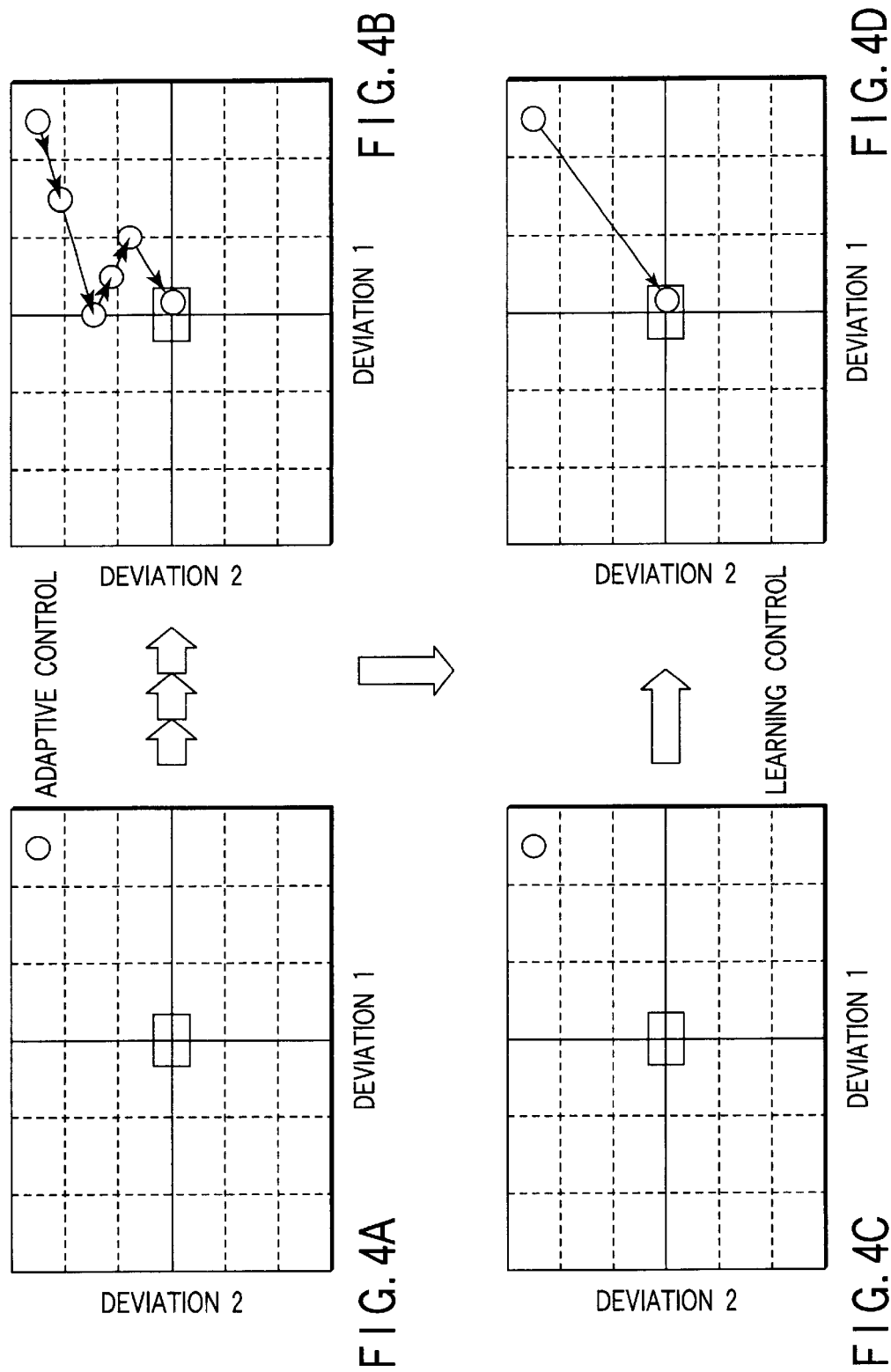
FIG. 4A to FIG. 4D show an example of a converging step in the adaptive control and learning control.

In order to compare the adaptive control and learning control, it is assumed that the initial deviation is the same. FIG. 4A shows the initial deviation in the adaptive control, and FIG. 4C shows the initial deviation in the learning control.

In the case of a non-experienced control amount pattern, the adaptive control is selected. Convergence is gradually carried out in the adaptive control from the initial deviation shown in FIG. 4A, and at last a tolerable value as shown in FIG. 4B is reached. If the operation amount associated with the obtained control amount pattern has reproducibility relating to the object characteristics in the process reaching the tolerable range, it is possible to operate the learnt operation amount (plural operation means at the same time) and to bring the initial deviation shown in FIG. 4C to the tolerable range shown in FIG. 4D by a single operation.

Even if the tolerable range is not reached, the adaptive control is switched and activated in the control amount pattern with no success experience, and a new success experience is attained by convergence.

Figure 5:
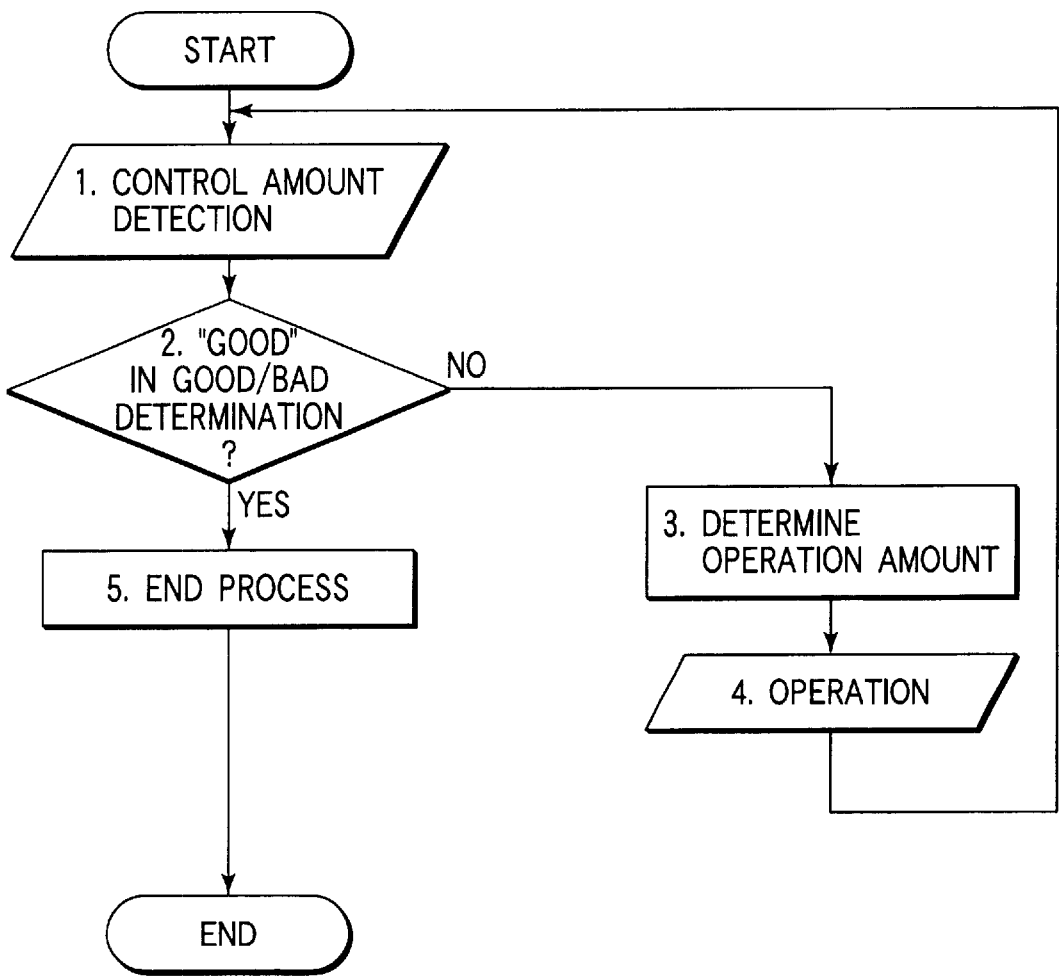
FIG. 5 is a flow chart illustrating an operation of the entirety of the adjustment control system.

FIG. 5 is a flow chart illustrating an operation of the entirety of the adjustment control system. The entire control is executed by a CPU, etc. Control amount detection and good/bad determination are performed. If a determination result is "bad", an operation amount is determined, and an operation is executed. Control then returns to the control amount detection, and this process is repeated until a good/bad determination result becomes "good." When a determination result "good" is obtained, an end process is performed.

Figure 6:
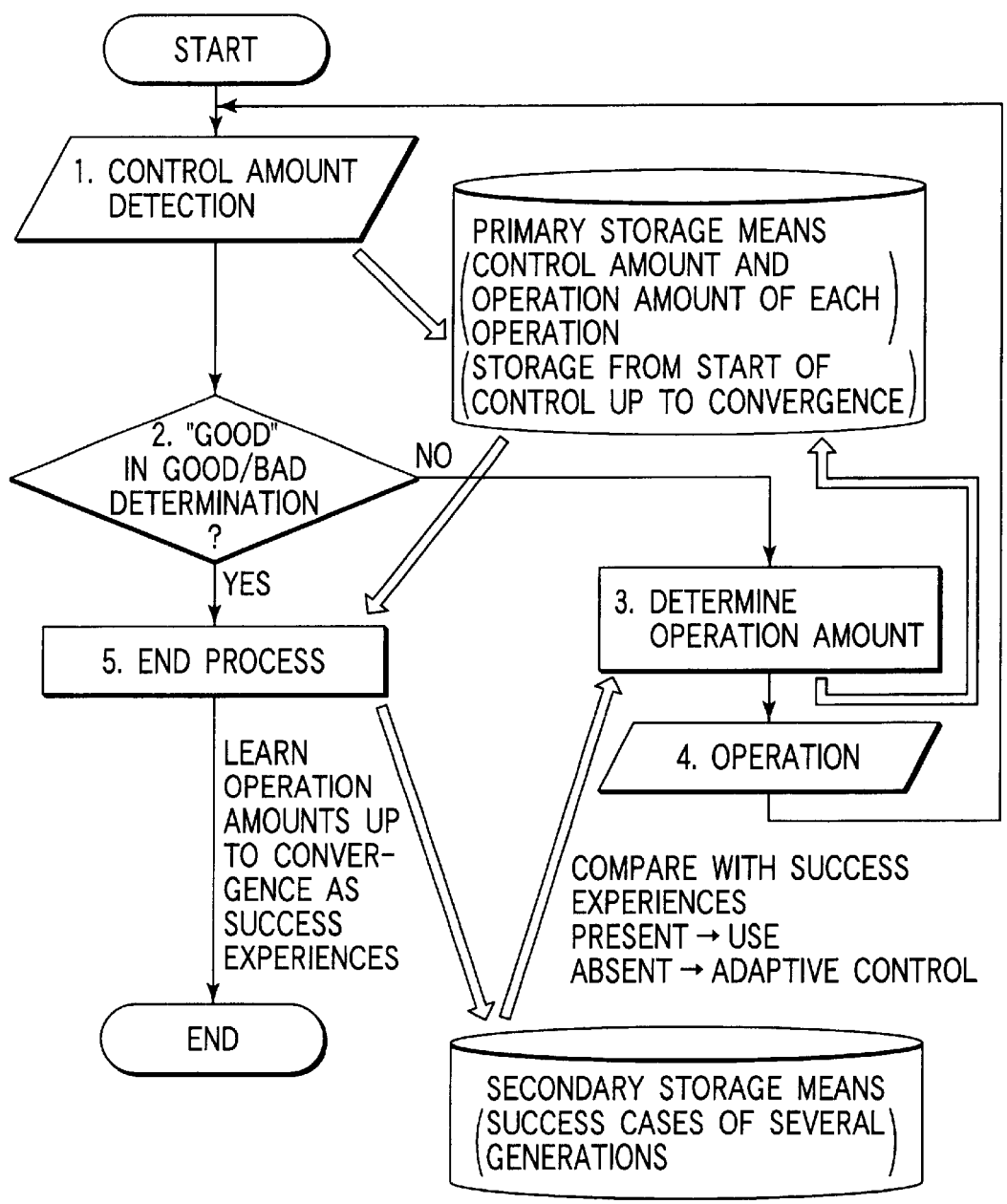
FIG. 6 is a flow chart illustrating a switching operation with learning in the adjustment control system.

FIG. 6 is a flow chart illustrating a switching operation with learning in the adjustment control system. Specifically, when a control amount has been detected, the control amount is stored in primary storage means such as a RAM (control amounts and operation amounts from the start of control to the convergence for respective operations are stored). If the good/bad determination result is "bad", the control amount is compared with success experiences read out from secondary storage means such as a non-volatile RAM. If there is a coincident success experience, it is utilized. If there is no coincident success experience, the adaptive control is executed to determine an operation amount and this operation amount, too, is stored in the primary storage means.

The operation is executed, the control amount is detected once again, and the control amount is stored in the primary storage means. This process is repeated until the good/bad determination result becomes "good."When the good/bad determination result has become "good," the end process is performed and the operation amounts stored in the primary storage means up to the convergence are stored in the secondary storage means as success experiences.

Figure 7:
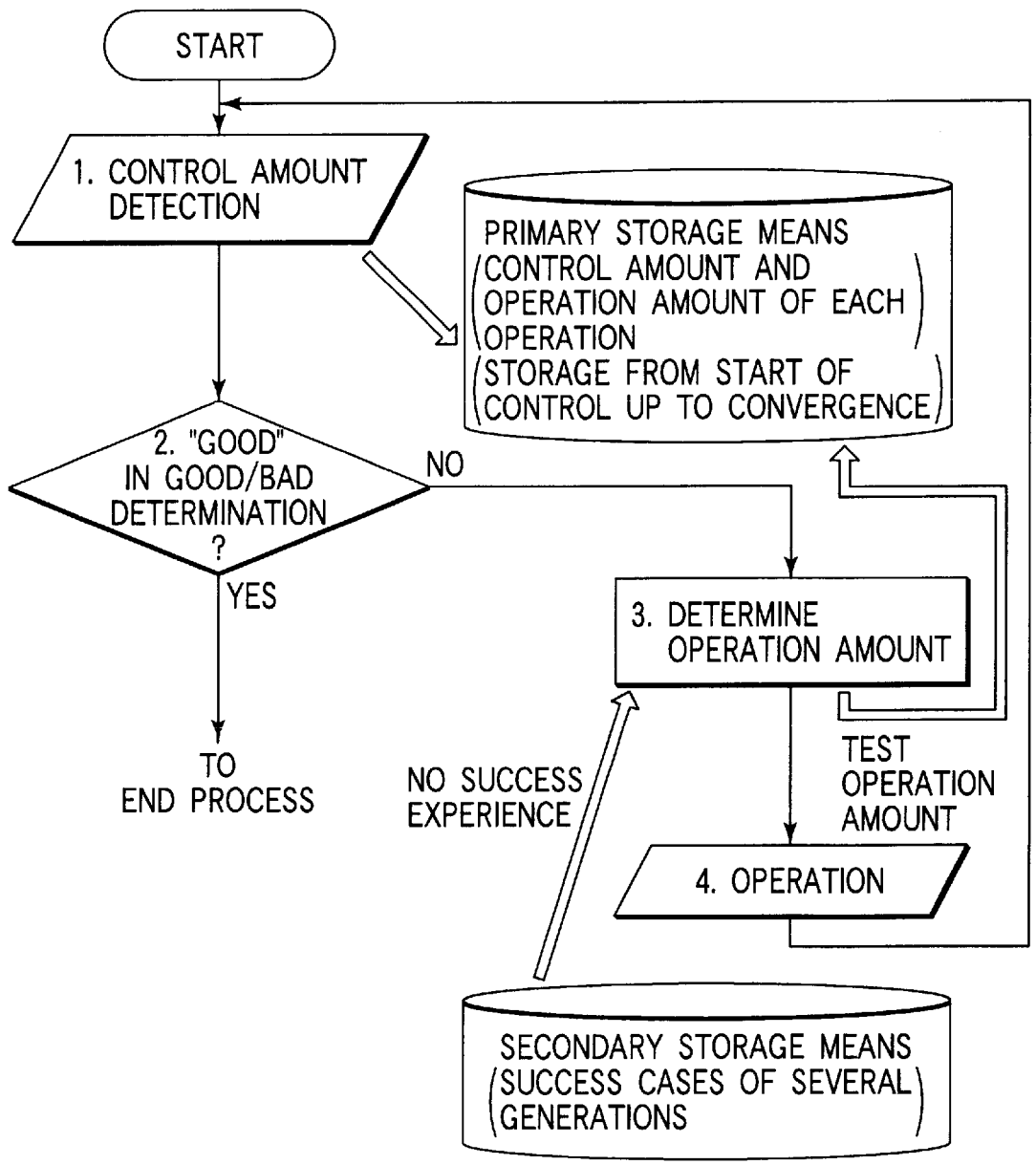
FIG. 7 is a flow chart illustrating a test operation in a case where there is no learning data of the adjustment control system.

FIG. 7 is a flow chart illustrating a function of a test operation (sensitivity measurement) in a case where there is no learning data in the adjustment control system. Specifically, when a control amount has been detected, the control amount is stored in primary storage means such as a RAM. If the good/bad determination result is "bad", the control amount is compared with success experiences read out from secondary storage means such as a non-volatile RAM. If there is no coincident success experience, the adaptive control is executed to first determine a test operation amount and this operation amount is stored in the primary storage means. Then, a test operation is executed.

Figure 8:
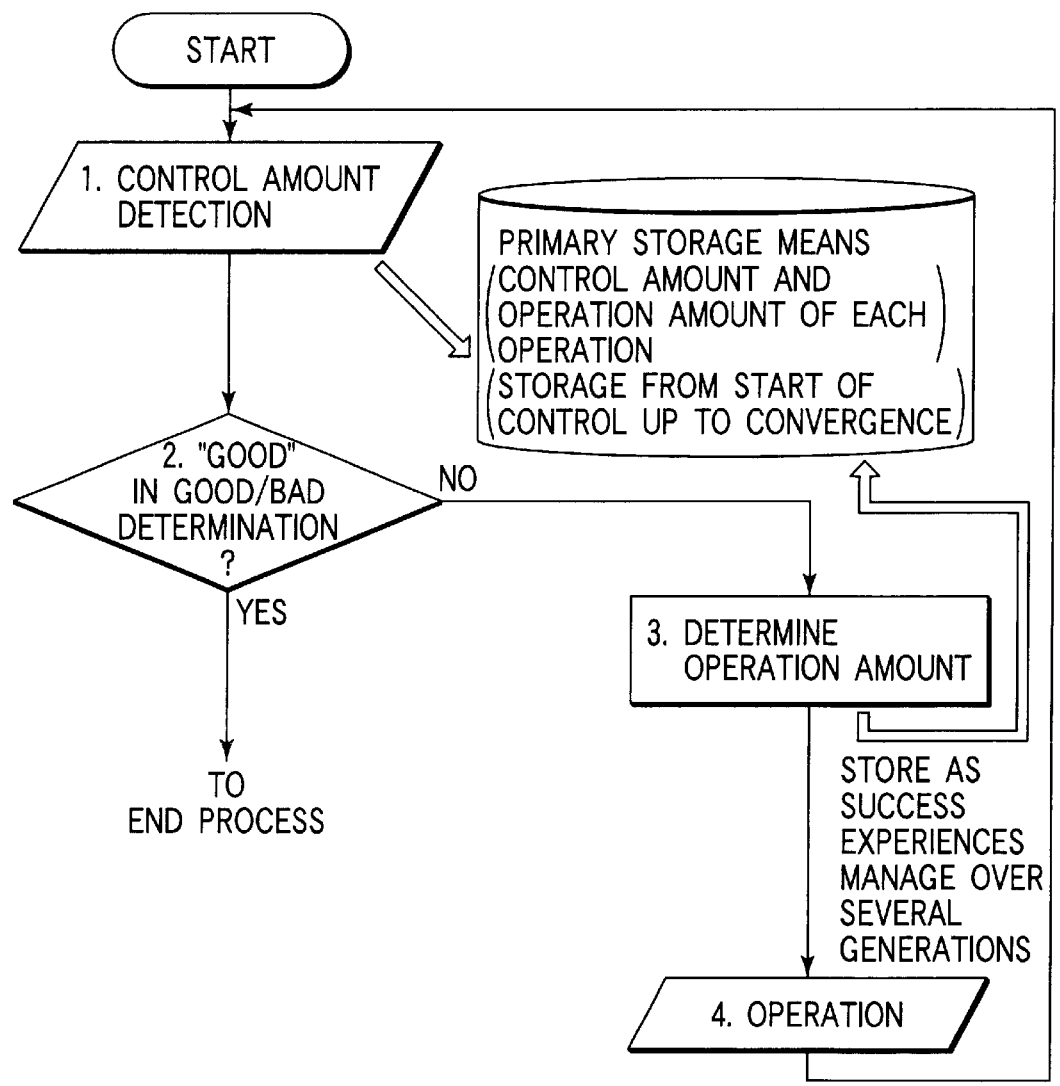
FIG. 8 is a flow chart illustrating a main operation in a case where there is no learning data of the adjustment control system.

FIG. 8 is a flow chart illustrating a function of a main operation in a case where there is no learning data in the adjustment control system. Specifically, after the test operation is executed, the control amount is detected and stored in the primary storage means. When the control amount has been determined to be "bad" in the good/bad determination, a main operation amount is determined on the basis of the sensitivity in the test operation, and this operation amount is stored in the primary storage means. Then, the operation is executed.

Figure 9:
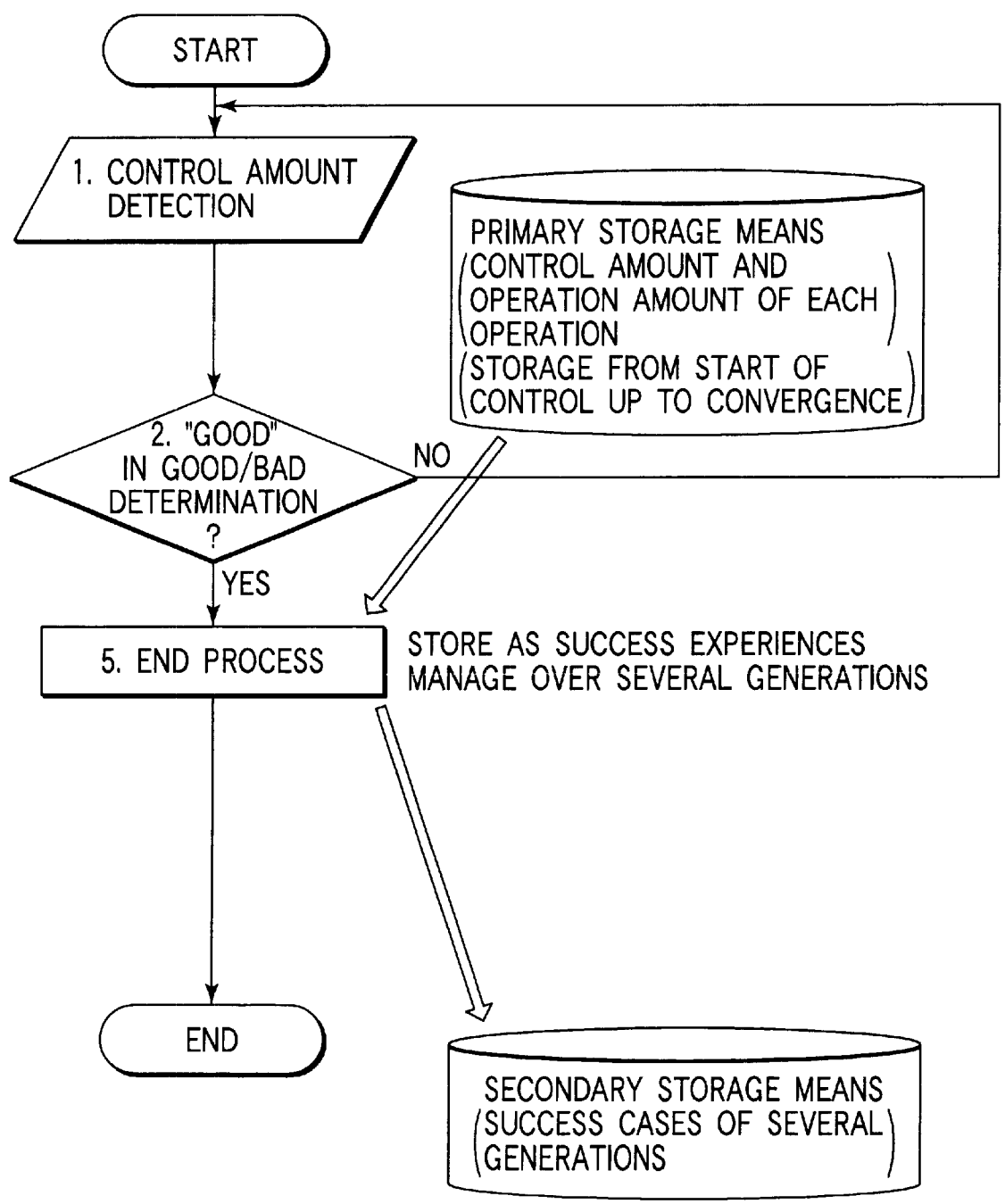
FIG. 9 is a flow chart illustrating a learning operation of a success case in the adjustment control system.

FIG. 9 is a flow chart illustrating an operation of learning of success cases (history up to convergence) in the adjustment control system. Specifically, the control amount is detected and good/bad determination is performed, and this process is repeated until the good/bad determination result becomes "good." When the good/bad determination result has become "good," the end process is performed. In this case, the control amounts and operation amounts stored in the primary storage means from the start of control up to the convergence are read out and stored in the secondary storage means as success experiences. The success cases are managed over several generations.

Figure 10:
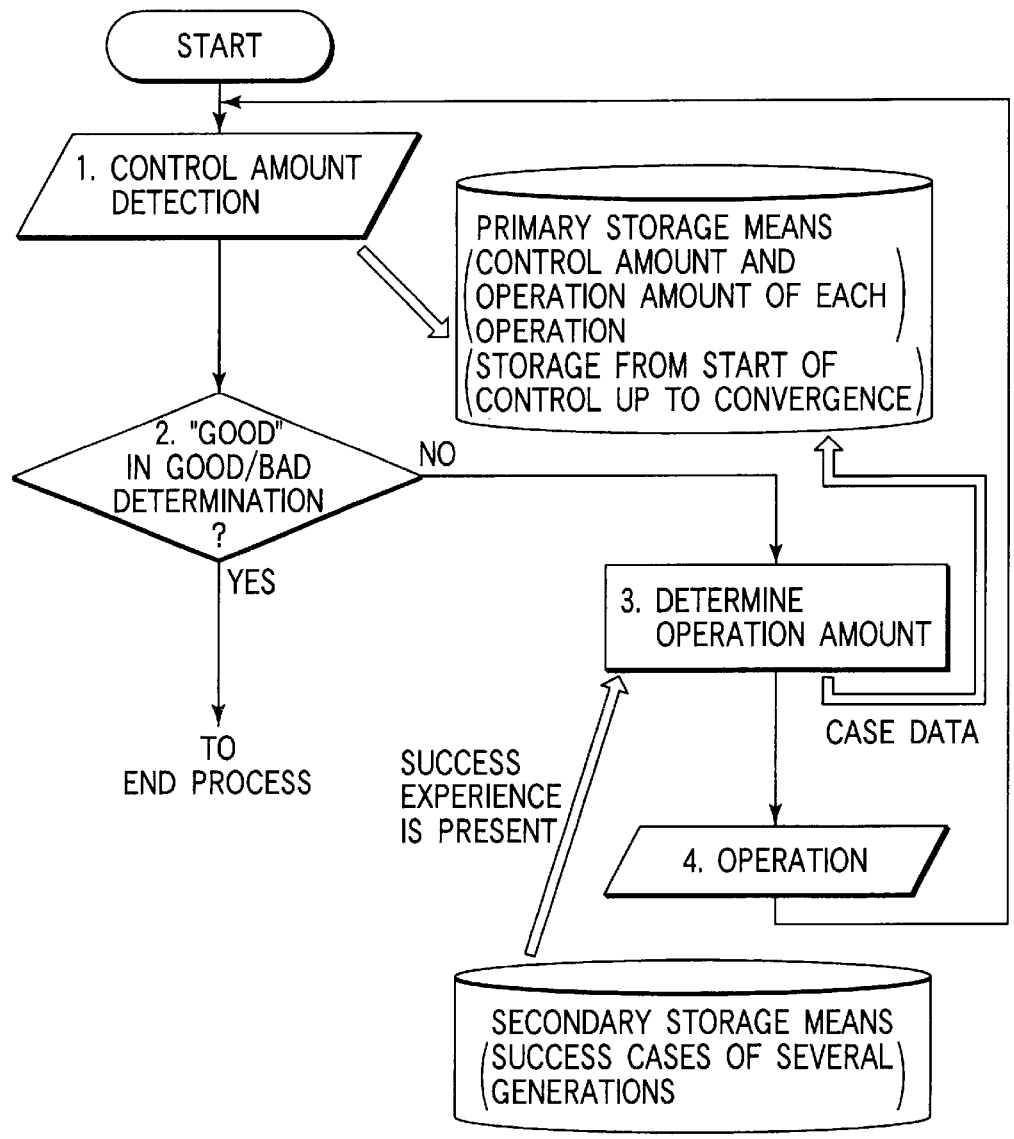
FIG. 10 is a flow chart illustrating an operation of utilizing a success experience in a case where there is learning data of the adjustment control system.

FIG. 10 is a flow chart illustrating a success experience utilizing operation in a case where there is learning data in the adjustment control system. Specifically, when a control amount has been detected, the control amount is stored in the primary storage means such as a RAM. When the control amount has been determined to be "bad" in the good/bad determination, it is compared with success experiences read out of the secondary storage means such as a non-volatile RAM. If there is a coincident success experience, an operation amount is determined based on this case data and the operation amount is stored in the primary storage means. Thus, the operation is executed.

Figure 11:
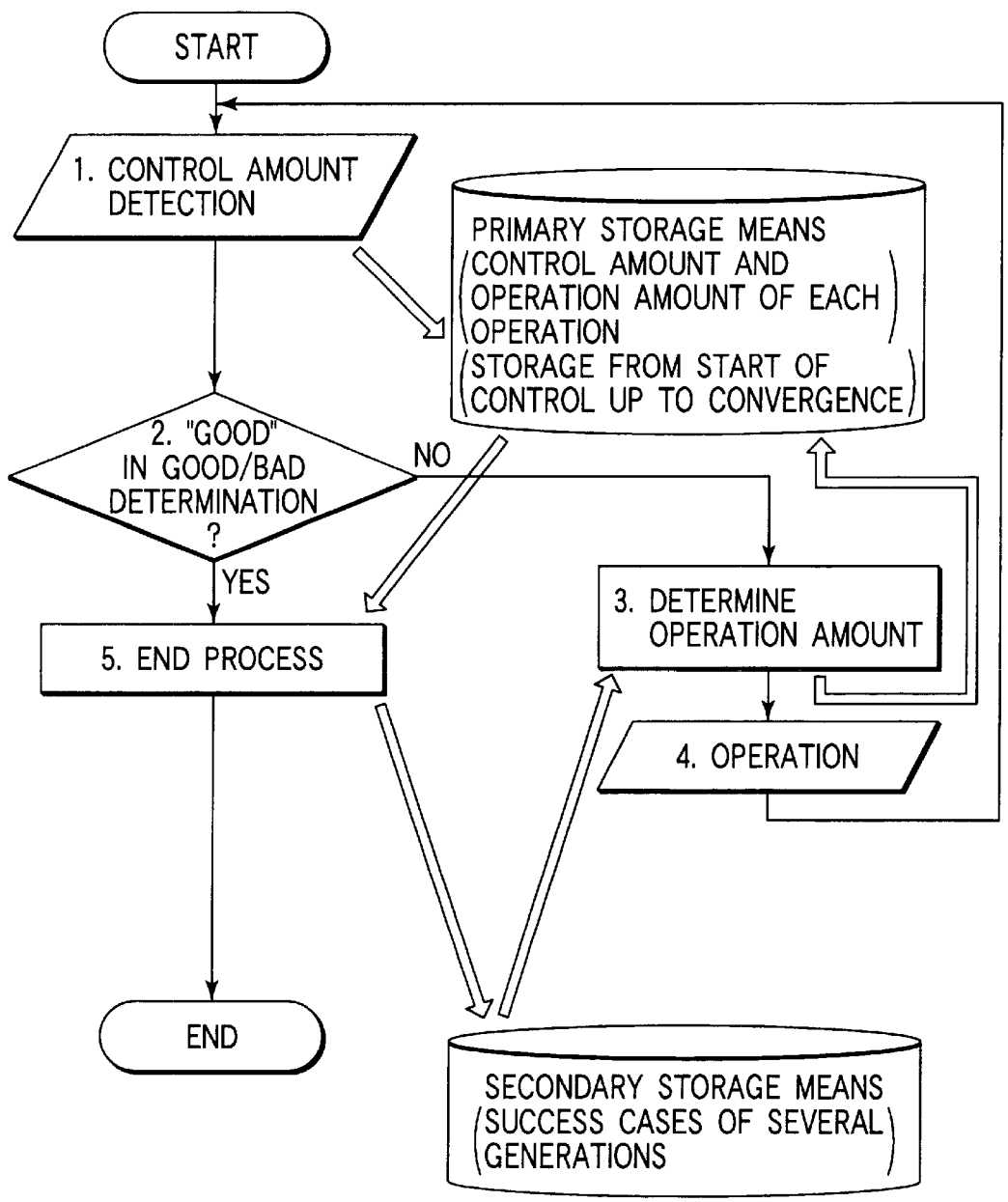
FIG. 11 is a flow chart illustrating an operation of accumulating learning data in the adjustment control system.

FIG. 11 is a flow chart illustrating a learning data accumulation operation in the adjustment control system. Specifically, when a control amount has been detected, the control amount is stored in primary storage means such as a RAM. If the good/bad determination result is "bad", the control amount is compared with success experiences read out from secondary storage means such as a non-volatile RAM. If there is a coincident success experience, it is utilized. If there is no coincident success experience, the adaptive control is executed to determine an operation amount and this operation amount, too, is stored in the primary storage means.

Subsequently, the operation is executed, and the control amount is detected once again. The control amount is stored in primary storage means. If the good/bad determination result is "bad", the adaptive control is executed to once again determine an operation amount and this operation amount, too, is stored in the primary storage means.

The adaptive control is repeated until the good/bad determination result becomes "good." When the good/bad determination result has become "good," the end process is performed. In this case, the control amounts and operation amounts stored in the primary storage means from the start of control up to the convergence are read out and stored in the secondary storage means as success experiences.

Figure 12:
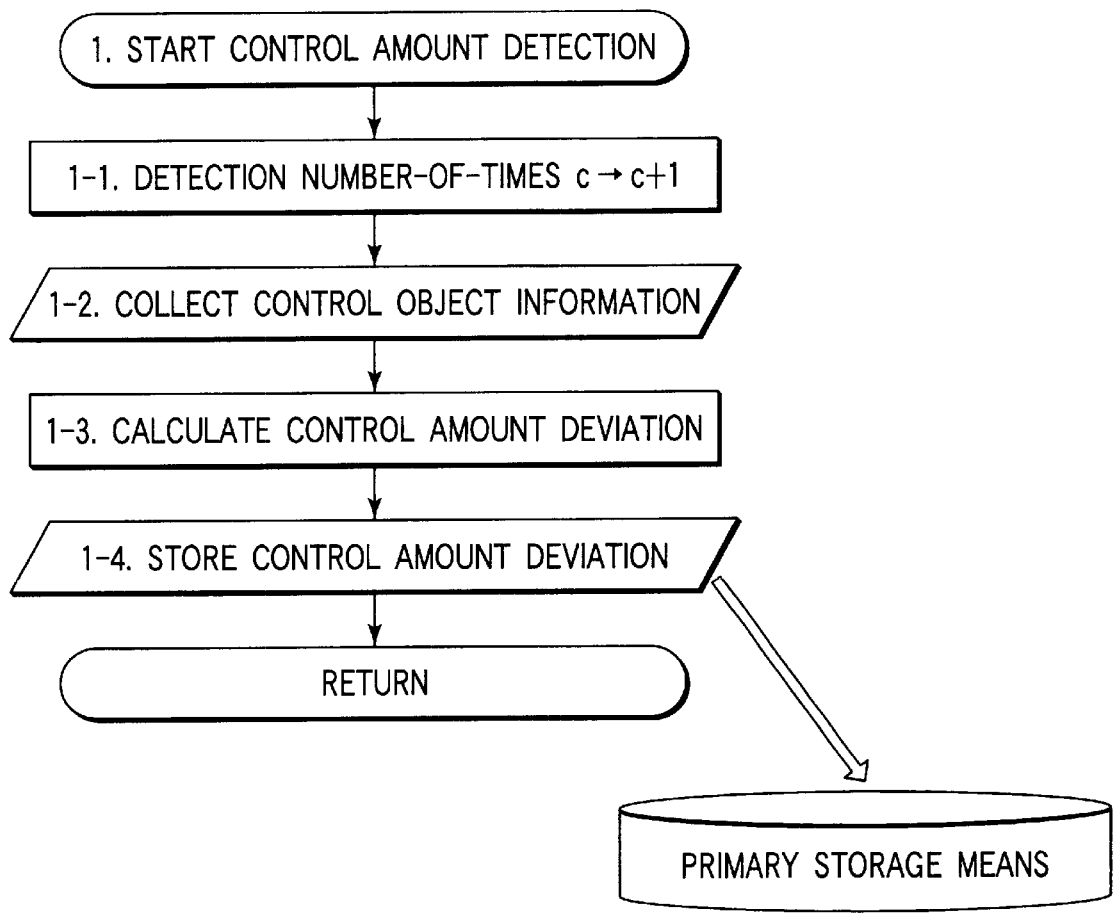
FIG. 12 is a flow chart illustrating an operation of control amount detection in the adjustment control system.

FIG. 12 is a flow chart illustrating an operation of control amount detection in the adjustment control system. To begin with, the number of times of detection in the operation is counted, and information from plural control objects is collected. Then, deviations of control amounts are calculated, and the plural control amount deviations are stored in the primary storage means such as a RAM.

Figure 13:
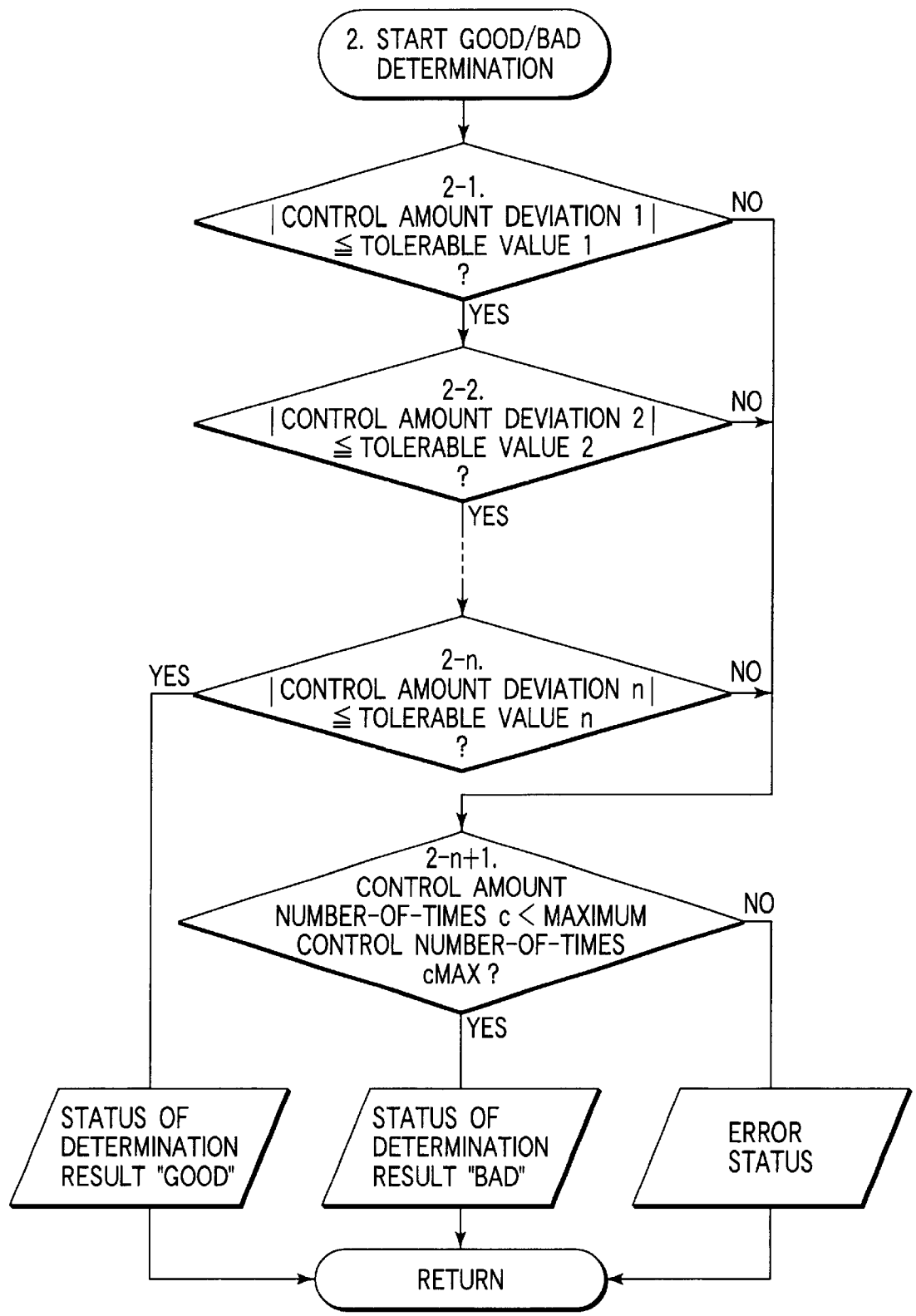
FIG. 13 is a flow chart illustrating a good/bad determination operation in the adjustment control system.

FIG. 13 is a flow chart illustrating the good/bad determination operation in the adjustment control system. To start with, plural control amount deviations at the time the control amounts have been detected are compared with tolerable values. For example, when the plural control amount deviations are control amount deviations 1, 2, . . . , n, it is determined whether control amount deviation 1 is less than, or equal to, tolerable value 1. Then, it is determined whether control amount deviation 2 is less than, or equal to, tolerable value 2, and it is determined whether control amount deviation n is less than, or equal to, tolerable value n. If all control amount deviations are less than, or equal to, the respective tolerable values, a good/bad determination result is "good," and status "good" is issued.

If any one of the control amount deviations 1 to n is greater than the tolerable value, a determination result is "bad". However, if the present control is repeated endlessly, a problem will occur in the actual apparatus in which this control is incorporated. Thus, in order to make this control feasible, it is necessary to preset a maximum control number-of-times. In the present embodiment, it is checked whether a control amount number-of-times c is greater than a preset maximum control number-of-times c. If not, a status of determination result "bad" is issued. If so, an error status is issued.

Figure 14:
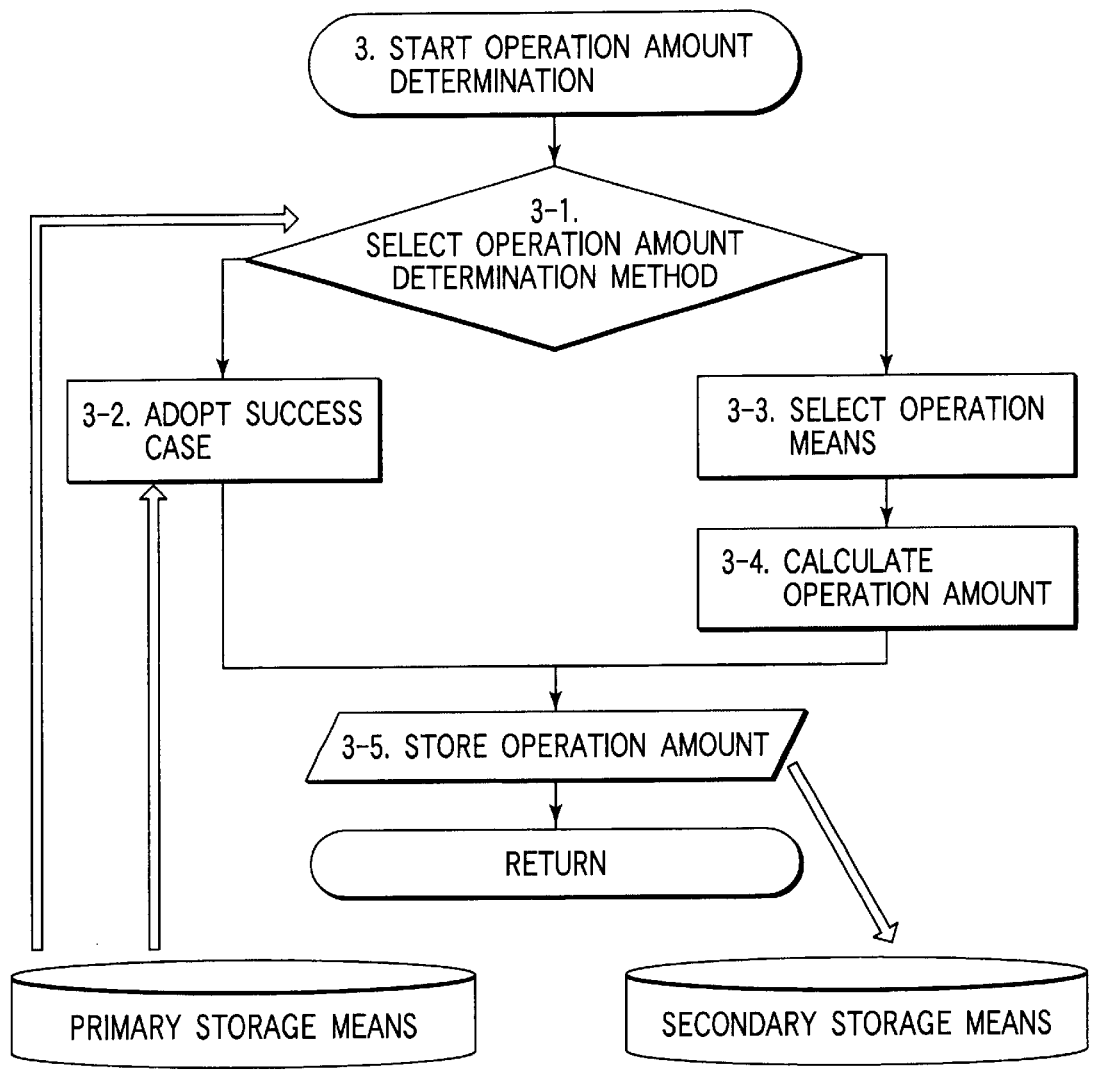
FIG. 14 is a flow chart illustrating an operation amount determination operation in the adjustment control system.

FIG. 14 is a flow chart illustrating an operation amount determination function in the adjustment control system. To start with, if the good/bad determination result "bad" is obtained following the storage of the detected control amount in the primary storage means, the operation amount determination method is selected. Plural control amount deviations based on the detected control amount are compared with success cases stored in the secondary storage means, and it is checked whether there is a coincident case. If there is a coincident case, this success case is adopted to determine the operation amount. If there is no coincident case, the adaptive control is executed and the operation means is selected. In addition, the operation amount is calculated and stored in the primary storage means.

Figure 15:
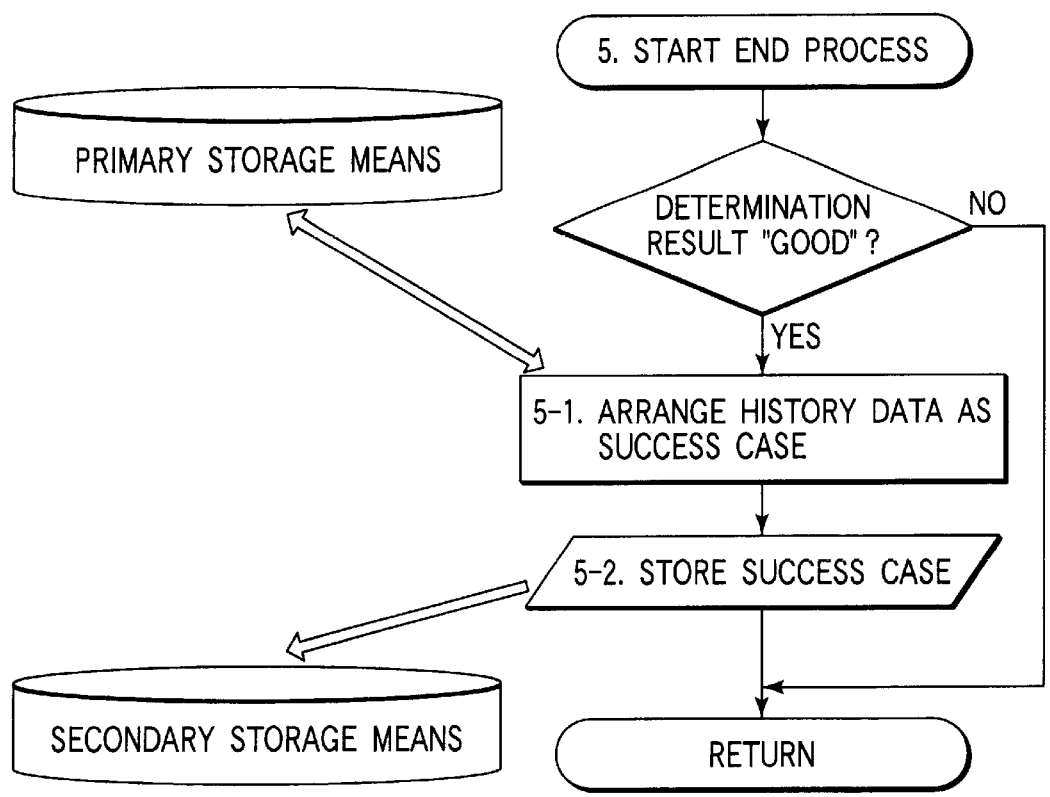
FIG. 15 is a flow chart illustrating an end process operation in the adjustment control system.

FIG. 15 is a flow chart illustrating an end process operation in the adjustment control system. If the good/bad determination result "good" is obtained, history data stored in the primary storage means is arranged as a success case and this success case is stored in the secondary storage means.

As has been described above, according to the present invention, a control system ensuring convergence is obtained. Thus, there is no possibility of failure of convergence. The control system can match with an inter-object variance and a variation over time in control system characteristics for success case learning in the adjustment object system.

As regards the efficiency of the convergence process, because of automatic adaptation of the apparatus, it should suffice if the essential convergence ensuring is realized by feedback control. It is possible to reduce labor for data collection, trial tests, etc. for optimization.

Labor for controller design (especially, tuning) can be reduced, and it is possible to provide a control system structure automatically adapting to an inter-object variance among control objects, a variation over time, etc.

Furthermore, both a convergence-ensured control, such as an adaptive control, and a learning control are used in combination. In a non-experienced situation, the sensitivity is examined in succession to determine the operation amount for convergence. When the convergence is completed, a successful experience is learnt and, in a similar situation, the learnt knowledge is utilized to perform operations. Thus, the number of times of operations for convergence can be reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An adjustment control system comprising:

first storage means for storing cases of a plurality of control amounts which have been adjusted and controlled to fall within a predetermined tolerable range;

detection means for detecting a plurality of control amounts;

determination means for determining whether each of the control amounts detected by the detection means falls within a predetermined tolerable range;

judgment means for judging, when it has been determined by the determination means that at least one of the plural control amounts is out of the predetermined tolerable range, whether there is a case among the plural control amounts stored in the first storage means which has been adjusted and controlled to fall within the predetermined tolerable range;

first control means for controlling, where the presence of the case of the adjustment control is judged by the judgment means, adjustment to bring each of the detected control amounts within the predetermined tolerable range on the basis of the case;

first operation means for determining and operating test operation amounts for measuring sensitivity, based on each detected control amount, where the absence of the case of the adjustment control has been judged by the judgment means;

second operation means for determining operation amounts from each detected control amount, based on the sensitivity measured by the test operations performed by the first operation means, and performing repeated operations until each detected control amount may fall with the predetermined tolerable range;

second storage means for storing the operation amounts operated by the first operation means and the plural control amounts, as well as the operation amounts repeatedly operated by the second operation means and the plural control amounts; and second control means for storing, when each control amount has fallen within the predetermined tolerable range by the operation of the second operation means, the operation amounts and the plural control amounts stored in the second storage means into the first storage means as cases of adjustment control.

2. An adjustment control system comprising:

adjustment means for performing adjustment by moving a plurality of objects requiring plural position controls such that the objects may be positioned at target positions;

first storage means for storing a case of adjustment performed by the adjustment means by moving the objects to the target positions;

detection means for detecting positions of the plural objects;

determination means for determining whether a deviation between the position of the object detected by the detection means and the target position of the object is within a predetermined tolerable range;

judgment means for judging, when the determination means has determined that the deviation of at least one of the plural objects is not within the predetermined tolerable range, whether there is a case in which the position of the object at this time has been adjusted and controlled to fall within the predetermined tolerable range of the target position of the object;

first adjustment control means for controlling, when the judgment means has judged that the case of adjustment is present, the adjustment means on the basis of the case, thereby moving the position of the object detected by the detection means into the predetermined range of the target position;

measuring means for measuring sensitivity of the adjustment means when the judgment means has judged that the case of adjustment is not present;

second adjustment control means for controlling the adjustment means on the basis of the sensitivity measured by the measuring means and repeating the adjustment operation of the adjustment means until the determination means determines that the deviation between the position of the object detected by the detection means and the target position of the object is within the predetermined range;

second storage means for storing a history of the adjustment operation of the second adjustment control means; and means for additionally storing the history of the adjustment operation stored in the second storage means into the first storage means when the second adjustment control means causes the adjustment means to move the object and the deviation between the position of the object and the target position of the object has fallen within the predetermined tolerable range.

3. An adjustment control method comprising: storing in first storage means cases of a plurality of control amounts which have been adjusted and controlled to fall within a predetermined tolerable range; detecting a plurality of control amounts; determining whether each of the detected control amounts falls within a predetermined tolerable range; judging, when it has been determined by the determination that at least one of the plural control amounts is out of the predetermined tolerable range, whether there is a case among the plural control amounts stored in the first storage means which has been adjusted and controlled to fall within the predetermined tolerable range; controlling, where the presence of the case of the adjustment control is judged by the judgment, adjustment to bring each of the detected control amounts within the predetermined tolerable range on the basis of the case; determining and operating test operation amounts for measuring sensitivity, based on each detected control amount, where the absence of the case of the adjustment control has been judged by the judgment; determining operation amounts from each detected control amount, based on the sensitivity measured by the test operations, and performing repeated operations until each detected control amount may fall with the predetermined tolerable range; storing in second storage means the operated operation amounts and the plural control amounts, as well as the repeatedly operated operation amounts and the plural control amounts; and storing, when each control amount has fallen within the predetermined tolerable range by the operation, the operation amounts and the plural control amounts stored in the second storage means into the first storage means as cases of adjustment control.

4. An adjustment control method comprising: performing adjustment with adjustment means by moving a plurality of objects requiring plural position controls such that the objects may be positioned at target positions; storing in first storage means a case of adjustment performed by the adjustment means by moving the objects to the target positions; detecting positions of the plural objects; determining whether a deviation between the detected position of the object and the target position of the object is within a predetermined tolerable range; judging, when it has been determined that the deviation of at least one of the plural objects is not within the predetermined tolerable range, whether there is a case in which the position of the object at this time has been adjusted and controlled to fall within the predetermined tolerable range of the target position of the object; controlling, when it has been judged that the case of adjustment is present, the adjustment means on the basis of the case, thereby moving the detected position of the object into the predetermined range of the target position; measuring sensitivity of the adjustment means when it has been judged that the case of adjustment is not present; controlling the adjustment means on the basis of the measured sensitivity and repeating the adjustment operation of the adjustment means until it is determined that the deviation between the detected position of the object and the target position of the object is within the predetermined range; storing in second storage means a history of the adjustment operation; and additionally storing the history of the adjustment operation stored in the second storage means into the first storage means when the adjustment means moves the object and the deviation between the position of the object and the target position of the object has fallen within the predetermined tolerable range.

* * * * *